United States Patent

Ezzat et al.

[11] Patent Number: 5,431,363
[45] Date of Patent: Jul. 11, 1995

[54] SHOCK ABSORBER MOUNTING BRACKET

[75] Inventors: Hesham A. Ezzat, Troy; Dwayne A. Dutton, Lake Orion; Archie H. Ewart, Jr., Waterford, all of Mich.

[73] Assignee: General Motors Corporation, Detroit, Mich.

[21] Appl. No.: 172,204

[22] Filed: Dec. 23, 1993

[51] Int. Cl.⁶ .............................................. A47B 96/06
[52] U.S. Cl. ..................... 248/205.1; 248/562; 280/697
[58] Field of Search ............... 248/200, 205.1, 562, 248/563; 280/697, 690

[56] References Cited

U.S. PATENT DOCUMENTS

| | | | |
|---|---|---|---|
| 2,069,420 | 2/1937 | Paton | 280/124 |
| 2,718,409 | 9/1955 | Kishline et al. | 280/106 |
| 3,078,103 | 2/1963 | Jelsch | 280/96.2 |
| 3,768,828 | 10/1973 | Klein | 280/702 |
| 3,797,852 | 3/1974 | Patterson et al. | 280/697 |
| 3,986,693 | 10/1976 | Johnson | 248/205 |
| 3,994,469 | 11/1976 | Swenson et al. | 248/585 |
| 4,083,545 | 4/1978 | Herbenar | 267/54 A |
| 4,408,794 | 10/1983 | Harasaki | 296/198 |
| 4,618,163 | 10/1986 | Hasler et al. | 280/785 |
| 4,723,811 | 2/1988 | Harasaki | 296/194 |
| 4,767,134 | 8/1988 | Booher | 280/697 X |
| 4,789,198 | 12/1988 | Ide | 296/192 |
| 4,789,199 | 12/1988 | Komatsu | 296/194 |
| 4,919,474 | 4/1990 | Adachi et al. | 296/194 |
| 4,955,663 | 9/1990 | Imura | 296/194 |
| 5,024,482 | 6/1991 | Harasaki et al. | 296/194 |
| 5,031,958 | 7/1991 | Fujita et al. | 296/194 |
| 5,052,742 | 10/1991 | Akoshima et al. | 296/192 |
| 5,080,389 | 1/1992 | Kawano et al. | 280/667 |
| 5,087,074 | 2/1992 | Komatsu et al. | 280/788 |
| 5,127,666 | 7/1992 | Fujinaka et al. | 280/688 |
| 5,145,204 | 9/1992 | Perkins | 280/668 |
| 5,169,171 | 12/1992 | Ban et al. | 280/688 |

FOREIGN PATENT DOCUMENTS 455173 2/1992 Japan .

OTHER PUBLICATIONS

"*Imagine the Impact*", SAE Detroit Section Technical Meeting, Michael Liedtke and Bruce Zemke, GM Technical Center, Warren, Mich., Oct. 19, 1993 (p. 20).

Primary Examiner—Ramon O. Ramirez
Attorney, Agent, or Firm—Anthony Luke Simon

[57] ABSTRACT

A bracket includes first and second portions for joining a suspension damper and a suspension spring to a vehicular body. The first portion of the bracket includes a wall having a ledge. A central opening is provided in the ledge for receiving the upper end of a damper. The second portion of the bracket includes a wall substantially perpendicular to the wall of the first portion. A seat is provided in the wall of the second portion to seat the upper end of a suspension spring. Preferably, the first and second portions are formed as a single casting.

5 Claims, 1 Drawing Sheet

SHOCK ABSORBER MOUNTING BRACKET

BACKGROUND OF THE INVENTION

1. Field of the Invention

The present invention relates generally to a vehicular body, and in particular is concerned with a mounting bracket secured to a rear portion of a vehicular body to receive upper ends of a shock absorber and a suspension spring.

2. Description of the Related Art

Stamped sheet metal parts are commonly used to form brackets and the like for attaching a shock absorber of a rear suspension system to an automotive body. Depending upon a specific application, a number of such parts are combined to form a bracket, which is secured to the body. An upper end of a shock absorber and its associated mount assembly (if desired) are then received by and secured to the bracket. In a similar manner, sheet metal parts are commonly used to provide a seat for rear suspension springs.

U.S. Pat. No. 3,986,693 issued Oct. 19, 1976 is an example of a bracket for mounting a shock absorber and seating a suspension spring. The bracket includes a planar mounting plate 12, an upstanding flange 18 and upstanding support plates 26 and 28.

SUMMARY OF THE INVENTION

The present invention includes a dual purpose bracket for mounting a damper of a suspension system to a vehicular body and seating a suspension spring. Preferably, the bracket is formed as a single casting, thereby eliminating several separately-formed parts which were combined to accomplish these functions in prior attachment configurations. Furthermore, the casting can include integral stiffening and strengthening features, such as ribs.

In a preferred embodiment, a bracket includes first and second portions for joining a suspension damper and a suspension spring to a vehicular body. The first portion of the bracket includes a wall having a ledge. A central opening is provided in the ledge for receiving the upper end of a damper. The second portion of the bracket includes a wall substantially perpendicular to the wall of the first portion. A seat is provided in the wall of the second portion to seat the upper end of a suspension spring. Preferably, the first and second portions are formed as a single casting.

DETAILED DESCRIPTION OF THE PREFERRED EMBODIMENT

Figure 1:
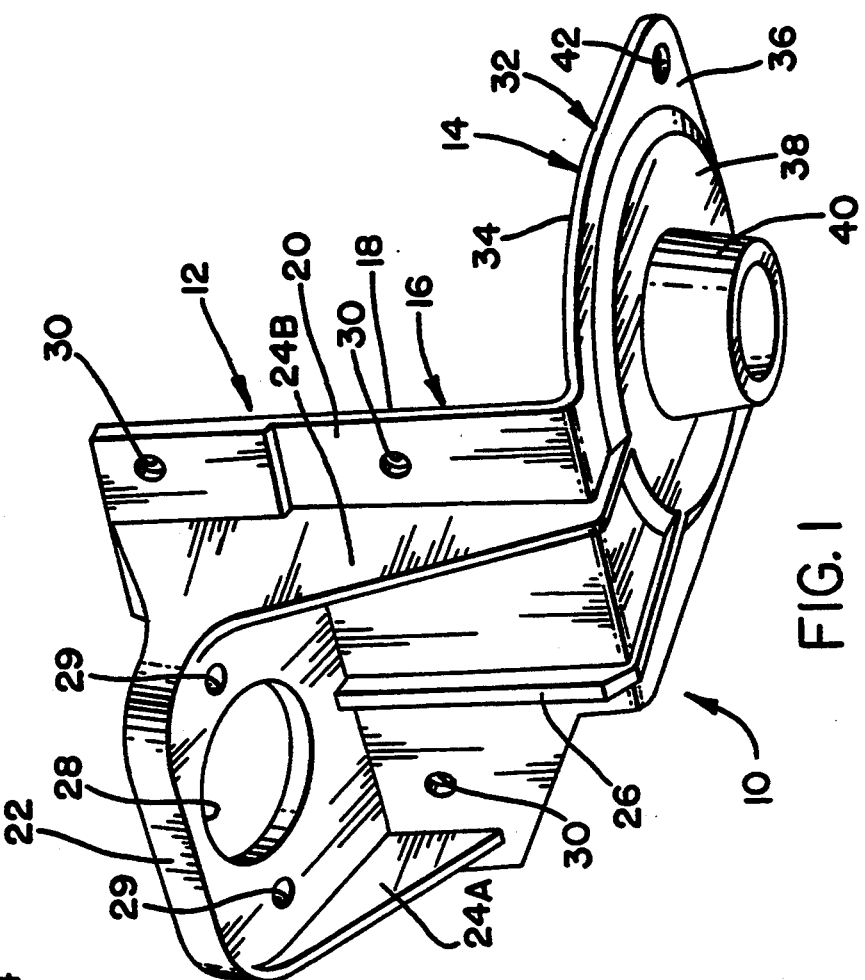
FIG. 1 is a perspective view of a preferred embodiment of a bracket according to the present invention illustrating a ledge for receiving a suspension shock absorber and a seat for seating a suspension spring.

A preferred embodiment of a shock absorber mounting bracket according to the present invention is indicated generally at 10 in FIG. 1. The bracket 10 includes a first, generally vertical portion 12 and a second., generally horizontal portion 14. Preferably, the first and second portions 12 and 14 are substantially perpendicular to each other. Although various techniques of manufacture can be utilized, it is preferred that the bracket 10 be formed as a single, integrally cast member. Preferably, the casting is formed from a material having high yield and ultimate strengths, and high elongation. For example, the casting if formed from aluminum.

The first portion 12 includes a substantially vertical wall 16 having an inner surface 18 and an outer surface 20. A ledge 22 projects outwardly from the outer surface 20. A pair of strengthening ribs 24A, 24B are formed on the outer surface 20 on opposite sides of the ledge 22. If desired, additional ribs such as rib 26 can be formed on the outer surface 20 between ribs 24A, 24B. A central opening 28 and side holes 29 are formed in the ledge 22 for receiving an upper end of a suspension damper, such as a shock absorber, and its associated mount assembly (if desired) as described below. A plurality of holes 30 for receiving fasteners (not illustrated in FIG. 1) are provided in the wall 16.

The second portion 14 includes a substantially horizontal wall 32 having an inner surface 34 and an outer surface 36. An annular depression 38 projects downwardly from the outer surface 36. A collar 40 projects downwardly from the depression 38, preferably perpendicular to the wall 32. A pair of holes 42 (only one of which is illustrated in the figures) for receiving fasteners (not illustrated in FIG. 1) are provided in the wall 32.

Figure 2:
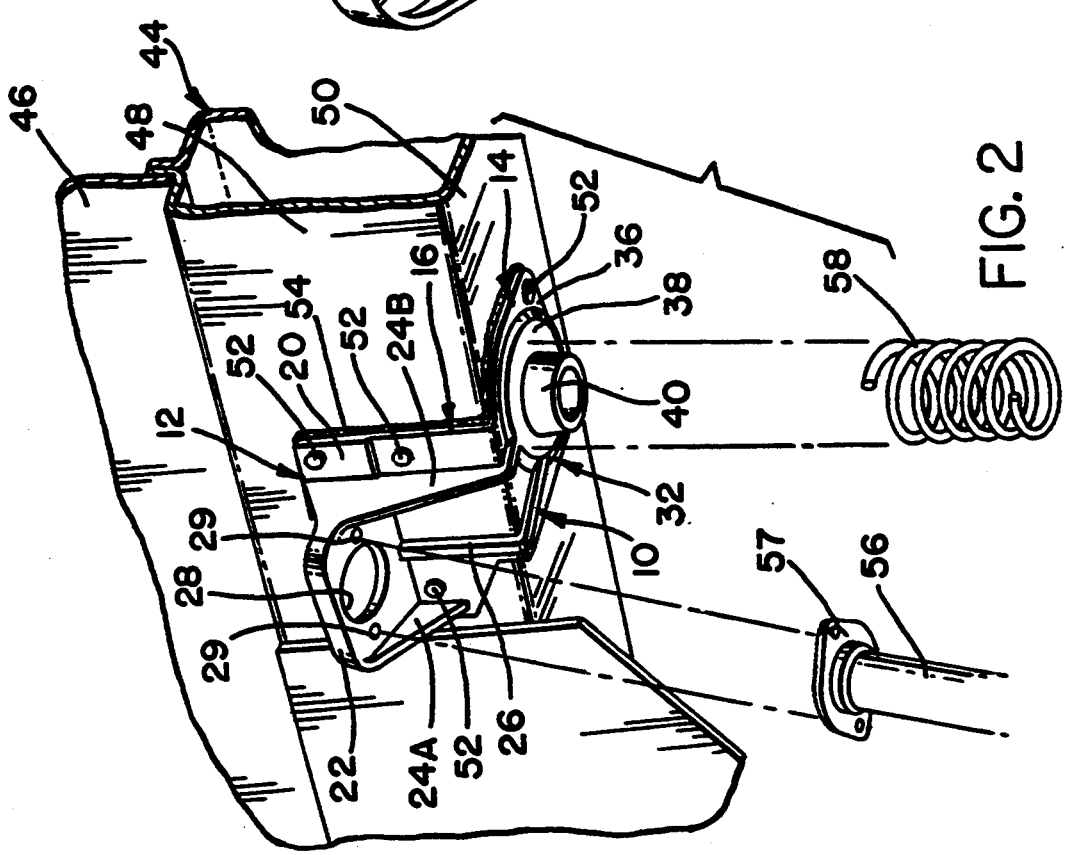
FIG. 2 is a perspective view of a portion of a rear body illustrating the bracket of FIG. 1 mounted to a lower rail and a shock absorber and a suspension spring exploded away from the bracket.

The bracket 10 is secured to a lower rail 44 of a vehicular body 46 as illustrated in FIG. 2. The inner surface 18 of the first portion 12 is placed against a vertical wall 48 of the rail 44 while the inner surface 34 of the second portion 14 is placed against a horizontal wall 50 of the rail 44. Fasteners, such as rivets 52, are received in holes 30 and 42 to secure the bracket 10 to the rail 44. If desired, a bonding material 54 such as an epoxy adhesive can be applied to enhance the attachment of the bracket 10 to the rail 44.

As described above, the upper end of a shock absorber 56 and its mount assembly 57 are secured to the ledge 22. Preferably, the ledge 22 is formed so that a plane passing through the ledge 22 is substantially perpendicular to a longitudinal axis of the shock absorber 56. Fasteners (not illustrated) are received in holes 29. The upper end of a suspension spring 58 is seated about the collar 40 on the depression 38 of the second portion 14. In this manner, the bracket 10 joins both the shock absorber 56 and the suspension spring 58 to the body 46.

In the embodiment of this specification, the first and second portions 12 and 14 are configured to fit a tubular rail 44. In other embodiments, the first and second portions 12 and 14 can have other configurations as desired to accommodate various body profiles.

Although the present invention has been described with reference to a preferred embodiment, persons skilled in the art will recognize that changes may be made in form and detail without departing from the spirit and scope of the invention.

The embodiments of the invention in which an exclusive property or privilege is claimed are defined as follows:

1. A shock absorber mounting bracket comprising:
   (a) a first wall having inner and outer surfaces;
   (b) a ledge projecting outwardly from the outer surface of the first wall for securing a shock absorber;
   (c) a second wall, having inner and outer surfaces, aligned substantially perpendicular to the first wall; and (d) seat means formed on the outer surface for seating a suspension spring.

2. The shock absorber mounting bracket specified in claim 1 wherein the first and second walls are integrally formed.

3. The shock absorber mounting bracket specified in claim 2 wherein the first and second walls are formed as an integral casting.

4. The shock absorber mounting bracket specified in claim 1 wherein the ledge includes a hole for receiving the shock absorber.

5. The shock absorber mounting bracket specified in claim 1 wherein the seat means includes a collar extending from the outer surface of the second portion.

* * * * *